US012640569B2

(12) United States Patent
Zhang et al.

(10) Patent No.: US 12,640,569 B2
(45) Date of Patent: May 26, 2026

(54) DIVISION METHOD AND SYSTEM FOR DISTRIBUTED RENEWABLE-ENERGY ELECTRICITY GENERATION CLUSTERS

(71) Applicant: Guizhou Power Grid Co., Ltd., Guiyang (CN)

(72) Inventors: Yu Zhang, Guiyang (CN); Libo Zhang, Guiyang (CN); Nan Mou, Guiyang (CN); Julong Chen, Guiyang (CN); Bin Wang, Guiyang (CN); Jia Yin, Guiyang (CN); Qingsheng Li, Guiyang (CN); Ying Liu, Guiyang (CN); Jierui Yang, Guiyang (CN); Zhaofeng Zhang, Guiyang (CN); Xueyong Tang, Guiyang (CN); Ming Lei, Guiyang (CN); Chao Lin, Guiyang (CN); Yong Yuan, Guiyang (CN); Yanle Liu, Guiyang (CN); Changwen Li, Guiyang (CN)

( * ) Notice: Subject to any disclaimer, the term of this patent is extended or adjusted under 35 U.S.C. 154(b) by 0 days.

(21) Appl. No.: 19/007,947

(22) Filed: Jan. 2, 2025

(65) Prior Publication Data

US 2025/0233425 A1      Jul. 17, 2025

Related U.S. Application Data

(63) Continuation of application No. PCT/CN2024/135941, filed on Nov. 29, 2024.

(30) Foreign Application Priority Data

Jan. 11, 2024      (CN) .......................... 202410039463.2

(51) Int. Cl.
*H02J 3/466*         (2026.01)
*H02J 3/38*          (2006.01)
(Continued)

(52) U.S. Cl.
CPC .............. *H02J 3/466* (2020.01); *H02J 3/381* (2013.01); *H02J 2101/24* (2026.01); *H02J 2101/28* (2026.01); *H02J 2103/35* (2026.01)

(58) Field of Classification Search
CPC ...................................................... H02J 3/466
(Continued)

(56) References Cited

U.S. PATENT DOCUMENTS 11,831,162 B1 * 11/2023 Kanan ................... H02J 3/0073
2018/0366603 A1 * 12/2018 Prengler ................ H10F 19/90

FOREIGN PATENT DOCUMENTS

CN          109599879 A       4/2019

* cited by examiner

*Primary Examiner* — Joseph Chang

(57) ABSTRACT

The present invention discloses a division method and system for distributed renewable-energy electricity generation clusters, where the method includes: obtaining electric power consumption-absorption data of the electricity-generation clusters; extracting and analyzing the absorbed electricity quantities of the corresponding target single electricity generators or the consumed electricity quantities of the corresponding target energy consumption nodes; constructing and determining consumption-absorption matching groups for a plurality of electricity generator sets and energy consumption districts according to distances from the target single electricity generators to the target energy consumption nodes, and executing division for the electricity-generation clusters. According to the present invention, energy waste can be avoided, and then management efficiency is increased.

9 Claims, 2 Drawing Sheets

(51) Int. Cl.
  *H02J 101/24*   (2026.01)
  *H02J 101/28*   (2026.01)
  *H02J 103/35*   (2026.01)
(58) Field of Classification Search
  USPC ......................................................... 307/43
  See application file for complete search history.

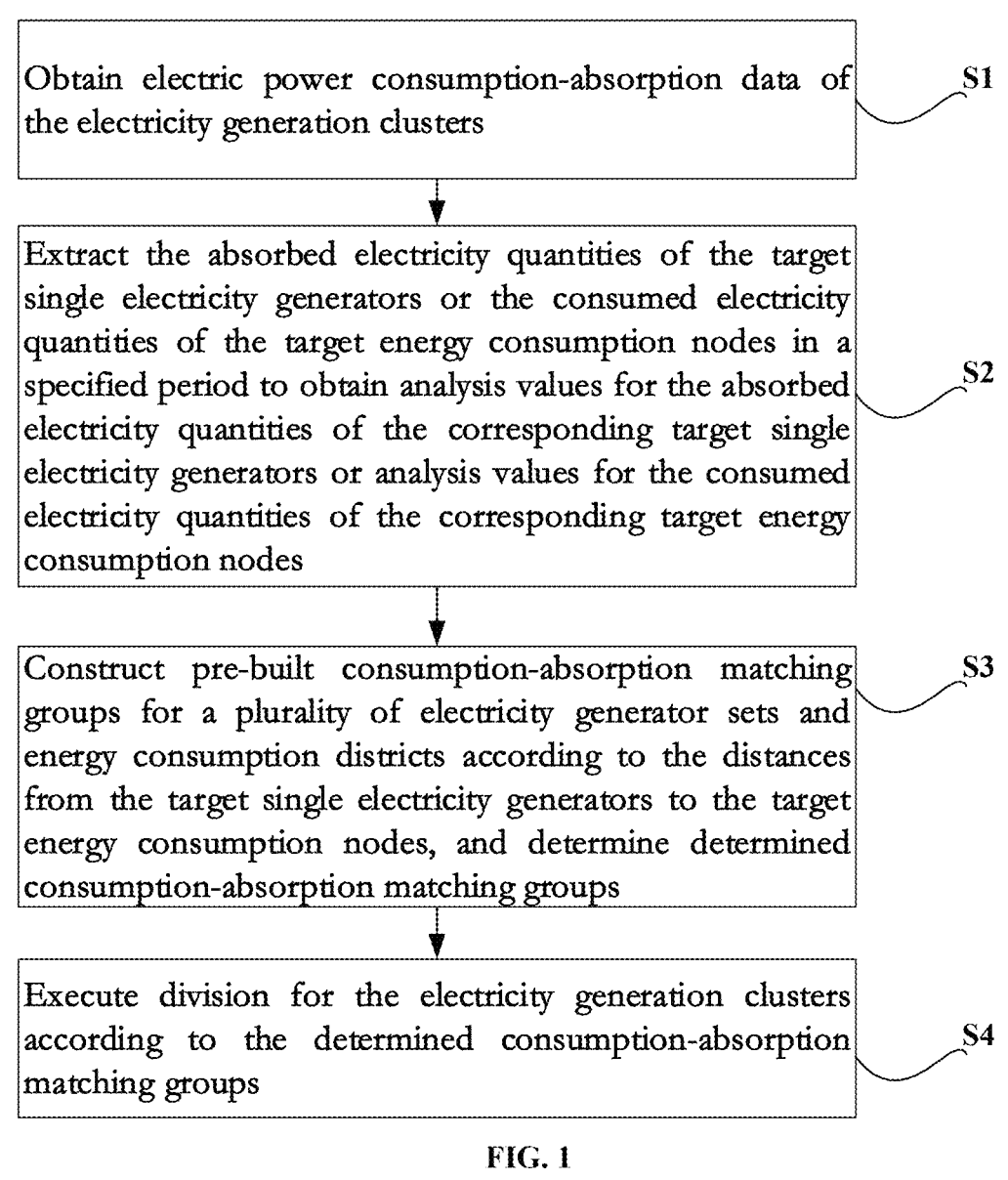

Obtain electric power consumption-absorption data of the electricity generation clusters    S1

Extract the absorbed electricity quantities of the target single electricity generators or the consumed electricity quantities of the target energy consumption nodes in a specified period to obtain analysis values for the absorbed electricity quantities of the corresponding target single electricity generators or analysis values for the consumed electricity quantities of the corresponding target energy consumption nodes    S2

Construct pre-built consumption-absorption matching groups for a plurality of electricity generator sets and energy consumption districts according to the distances from the target single electricity generators to the target energy consumption nodes, and determine determined consumption-absorption matching groups    S3

Execute division for the electricity generation clusters according to the determined consumption-absorption matching groups    S4

FIG. 1

DIVISION METHOD AND SYSTEM FOR DISTRIBUTED RENEWABLE-ENERGY ELECTRICITY GENERATION CLUSTERS

CROSS-REFERENCE TO RELATED APPLICATIONS

The present application claims priority to Chinese Patent Application No. 2024100394632, filed on Jan. 11, 2024, the entire disclosure of which is incorporated herein by reference.

TECHNICAL FIELD

The present invention relates to the technical field of renewable energy division, and especially relates to a division method and system for distributed renewable-energy electricity generation clusters.

BACKGROUND

Mutually integrating dispersed renewable energy and small-scale electricity generation systems, as well as supplying the dispersed renewable energy and the small-scale electricity generation systems to user loads, and integrating the dispersed renewable energy and the small-scale electricity generation systems into an electricity distribution network by a distributed electricity generation system according to the principle of proximity is an ideal way to realize high-efficiency utilization for the renewable energy, as well as energy conservation and emission reduction.

The patent with a publication number CN109599879A discloses a scheduling method for an active power of an electricity distribution network and considering optimization for charging and discharging times of energy storage devices, where it is proposed that a gateway load curve of a prediction point 96 in the next day is obtained according to daily load prediction and photovoltaic electricity generation prediction of the electricity distribution network, then charging and discharging of the energy storage devices are controlled according to an energy storage action demand, as well as an upper limit and a lower limit of an energy storage capacity, and an energy storage adjustment quantity of the prediction point 96 is distributed to the energy storage devices in the form of a power. However, electric power consumption-absorption capability of electricity generation clusters and electricity consumption areas is not considered in the method, so that there is a problem of a low utilization rate for distributed energy. The present invention provides a division method and system for distributed renewable-energy electricity generation clusters, which can effectively improve consumption-absorption capability for distributed energy.

SUMMARY

The purpose of the present part is to outline some aspects of the examples of the present invention and to briefly describe some preferred examples. Some simplifications or omissions may be made in the present part as well as the abstract of the specification and the title of invention of the present application, so as not to obscure the purpose of the present part as well as the abstract of the specification and the title of invention; however, such simplifications or omissions cannot be used for limiting the scope of the present invention.

In view of the above existing problem, the present invention is proposed. Therefore, the present invention provides a division method for distributed renewable-energy electricity generation clusters, for solving a problem of a low utilization rate for distributed energy due to no consideration for electric power consumption-absorption capability.

In order to solve the above technical problem, the present invention provides the following technical solution:

in a first aspect, the present invention provides a division method for distributed renewable-energy electricity generation clusters, and the division method for the distributed renewable-energy electricity generation clusters includes:

obtaining electric power consumption-absorption data of the electricity generation clusters, wherein the electric power consumption-absorption data comprises absorbed electricity quantities of target single electricity generators, consumed electricity quantities of target energy consumption nodes, and distances from the target single electricity generators to the target energy consumption nodes;

extracting the absorbed electricity quantities of the target single electricity generators or the consumed electricity quantities of the target energy consumption nodes in a specified period on the basis of the electric power consumption-absorption data, calculating deviation degrees of the absorbed electricity quantities of the target single electricity generators or the consumed electricity quantities of the target energy consumption nodes in the specified period, comparing the deviation degrees with a preset deviation threshold value interval, and combining a first set and a second set according to comparison results, so as to obtain analysis values for the absorbed electricity quantities of the corresponding target single electricity generators or analysis values for the consumed electricity quantities of the corresponding target energy consumption nodes;

carrying out a division analysis on the electricity generation clusters on the basis of the analysis values for the consumed electricity quantities and the analysis values for the absorbed electricity quantities, constructing pre-built consumption-absorption matching groups for a plurality of electricity generator sets and energy consumption districts according to the distances from the target single electricity generators to the target energy consumption nodes, carrying out a consumption-absorption relationship analysis on the pre-built consumption-absorption matching groups through the analysis values for the consumed electricity quantities and the analysis values for the absorbed electricity quantities, redistributing the electricity generator sets and the energy consumption districts in the pre-built consumption-absorption matching groups according to an analysis result, and determining determined consumption-absorption matching groups; and executing division for the electricity generation clusters according to the determined consumption-absorption matching groups.

As a preferred solution for the division method for the distributed renewable-energy electricity generation clusters of the present invention, the extraction processing includes:

dividing a specified period into a plurality of standard time periods, and unifying durations of the standard time periods;

selecting one target single electricity generator or one target energy consumption node, and obtaining absorbed electricity quantities of the target single electricity generator in the standard time periods or consumed electricity quantities of the target energy consumption node in the standard time periods;

calculating deviation degrees of the absorbed electricity quantities and the consumed electricity quantities according to a variance formula;

comparing the deviation degrees with Xy1 and Xy2 in a preset deviation threshold value interval [Xy1, Xy2], where Xy1>Xy2; and counting intersections between the first set and the second set through a set operation, obtaining all the corresponding absorbed electricity quantities and consumed electricity quantities according to the intersections, and evaluating an average value of the absorbed electricity quantities or the consumed electricity quantities, so as to obtain analysis values for the absorbed electricity quantities of the corresponding target single electricity generators or analysis values for the consumed electricity quantities of the corresponding target energy consumption nodes.

As a preferred solution for the division method for the distributed renewable-energy electricity generation clusters of the present invention, the comparing the deviation degrees with a preset deviation threshold value interval includes:

comparing the deviation degrees with Xy1 in a preset deviation threshold value interval;

if the deviation degrees are greater than Xy1, it indicates that the deviation degree values among the absorbed electricity quantities or the consumed electricity quantities in the standard time periods are large, sequentially deleting the values of the corresponding absorbed electricity quantities or the corresponding consumed electricity quantities according to an order of $|Xi-Xp|$ from large to small, and correspondingly calculating deviation degrees of remaining absorbed electricity quantities or remaining consumed electricity quantities until the deviation degrees are less than or equal to Xy1;

wherein Xp represents an average value of the corresponding absorbed electricity quantity or the corresponding consumed electricity quantity in the standard time periods used for calculating the corresponding deviation degrees;

obtaining all the deleted values of the absorbed electricity quantities or consumed electricity quantities, and combining the values into a first set;

comparing the deviation degrees with Xy2 in the preset deviation threshold value interval;

if the deviation degrees are greater than Xy2, it indicates that the deviation degree values among the absorbed electricity quantities or the consumed electricity quantities in the standard time periods are large, sequentially deleting the values of the corresponding absorbed electricity quantities or the corresponding consumed electricity quantities according to an order of $|Xi-Xp|$ from large to small, and correspondingly calculating deviation degrees of remaining absorbed electricity quantities or remaining consumed electricity quantities until the deviation degrees are less than or equal to Xy2;

obtaining all undeleted values of the absorbed electricity quantities or consumed electricity quantities, and combining the values into a second set.

As a preferred solution for the division method for the distributed renewable-energy electricity generation clusters of the present invention, the division analysis includes:

grouping a plurality of adjacent target single electricity generators according to geographical positions of all the target single electricity generators, and forming a plurality of electricity generator sets;

grouping a plurality of adjacent target energy consumption nodes according to geographical positions of all the target energy consumption nodes, and forming a plurality of energy consumption districts;

obtaining distance values from the electricity generator sets to the energy consumption districts according to the distances from the target single electricity generators to the target energy consumption nodes, and enabling the energy consumption districts and the electricity generator sets which have the minimum distance value to form pre-built consumption-absorption matching groups;

obtaining common energy consumption districts from the pre-built consumption-absorption matching groups, meanwhile, obtaining the energy consumption districts which do not exist in the pre-built consumption-absorption matching groups, obtaining the group of the energy consumption district and the electricity generator set which have the minimum distance value from the electricity generator sets corresponding to the common energy consumption districts to form new pre-built consumption-absorption matching groups, and meanwhile, dissolving the former pre-built consumption-absorption matching groups formed according to the common energy consumption districts, and forming a plurality of unmatched electricity generator sets; and enabling the energy consumption districts which do not exist in the pre-built consumption-absorption matching groups and the unmatched electricity generator sets to form new pre-built consumption-absorption matching groups respectively, until there are no common energy consumption districts in the pre-built consumption-absorption matching groups.

As a preferred solution for the division method for the distributed renewable-energy electricity generation clusters of the present invention, the determining determined consumption-absorption matching groups includes:

calculating a total value of the consumed electricity quantities and a total value of the absorbed electricity quantities of the pre-built consumption-absorption matching groups on the basis of the analysis values for the consumed electricity quantities and the analysis values for the absorbed electricity quantities;

comparing the total value of the consumed electricity quantities and the total value of the absorbed electricity quantities in the pre-built consumption-absorption matching groups with a preset floating threshold value, if either NZ<HZ−FY or NZ>HZ+FY is met, it indicates that matching for the pre-built consumption-absorption matching groups is failed, and consumption-absorption relationships between all the target single electricity generators and all the corresponding target energy consumption nodes in the pre-built consumption-absorption matching groups do not meet division standards, and then carrying out matching analysis and division;

wherein FY represents the floating threshold value, HZ represents the total value of the consumed electricity quantities in one pre-built consumption-absorption matching group, NZ represents the total value of the absorbed electricity quantities in one pre-built consumption-absorption matching group, and the division standards are determined according to the preset floating threshold value;

sequentially marking the energy consumption districts according to distances among the center points of corresponding geographical positions of the energy consumption districts composed of the target energy consumption nodes in a contiguous manner, wherein the center points of the corresponding geographical positions of the energy consumption districts are selected according to geographical positions of the plurality of target energy consumption nodes in the energy consumption districts;

sequentially marking the electricity generator sets according to distances among the center points of corresponding geographical positions of the electricity generator sets composed of the target single electricity generators in a contiguous manner, wherein the center points of the corresponding geographical positions of the electricity generator sets are selected according to geographical positions of the plurality of target single electricity generators in the electricity generator sets;

carrying out a matching analysis on the first corresponding pre-built consumption-absorption matching group in the sequential marking through the energy consumption districts with sequential marks or the electricity generator sets with sequential marks;

obtaining the corresponding pre-built consumption-absorption matching groups of the remaining energy consumption districts through the sequential marking, and carrying out matching success confirmation and division for the pre-built consumption-absorption matching groups in a manner of carrying out the matching analysis on the first corresponding pre-built consumption-absorption matching group in the sequential marking; and recording the pre-built consumption-absorption matching groups with successful matching as determined consumption-absorption matching groups on the basis of results obtained through the matching.

As a preferred solution for the division method for the distributed renewable-energy electricity generation clusters of the present invention, the matching analysis for the energy consumption districts includes:

obtaining the corresponding pre-built consumption-absorption matching group of the first energy consumption district through sequential marking;

when the matching for the pre-built consumption-absorption matching group is failed, and NZ<HZ–FY is met, it indicates that there are too many corresponding target energy consumption nodes of the energy consumption district in the pre-built consumption-absorption matching group, and when NZ>HZ+FY is met, it indicates that there are too few corresponding target energy consumption nodes of the energy consumption district in the pre-built consumption-absorption matching group;

according to the corresponding sequential mark of the energy consumption district, obtaining the sequential mark adjacent to the sequential mark and the corresponding adjacent energy consumption district, extracting the target energy consumption node with the minimum distance value from the target energy consumption node in the adjacent energy consumption district from the energy consumption district, and guiding the target energy consumption node into the adjacent energy consumption district; and comparing the total value of the consumed electricity quantities and the total value of the absorbed electricity quantities in the pre-built consumption-absorption matching groups with a preset floating threshold value, until that HZ–FY is less than or equal to NZ and NZ is less than or equal to HZ+FY is met.

As a preferred solution for the division method for the distributed renewable-energy electricity generation clusters of the present invention, the matching analysis for the electricity generator sets includes:

obtaining the corresponding pre-built consumption-absorption matching group of the first electricity generator set through sequential marking;

when the matching for the pre-built consumption-absorption matching group is failed, and NZ>HZ+FY is met, it indicates that there are too many corresponding target single electricity generators of the electricity generator set in the pre-built consumption-absorption matching group, and when NZ<HZ–FY is met, it indicates that there are too few corresponding target single electricity generators of the electricity generator set in the pre-built consumption-absorption matching group;

according to the corresponding sequential mark of the electricity generator set, obtaining the sequential mark adjacent to the sequential mark and the corresponding adjacent electricity generator set, extracting the target single electricity generator with the minimum distance value from the target single electricity generator in the adjacent electricity generator set from the electricity generator set, and guiding the target single electricity generator into the adjacent electricity generator set; and comparing the total value of the consumed electricity quantities and the total value of the absorbed electricity quantities in the pre-built consumption-absorption matching groups with a preset floating threshold value, until that HZ–FY is less than or equal to NZ and NZ is less than or equal to HZ+FY is met.

In a second aspect, the present invention provides a division system for distributed renewable-energy electricity generation clusters, and the division system for the distributed renewable-energy electricity generation clusters includes:

a data obtaining module used for obtaining electric power consumption-absorption data of the electricity generation clusters, wherein the electric power consumption-absorption data comprises absorbed electricity quantities of target single electricity generators, consumed electricity quantities of target energy consumption nodes, and distances from the target single electricity generators to the target energy consumption nodes;

an extraction module used for carrying out extraction processing on the absorbed electricity quantities of the target single electricity generators or the consumed electricity quantities of the target energy consumption nodes in a specified period;

an analysis processing module used for carrying out a division analysis on the electricity generation clusters, constructing pre-built consumption-absorption matching groups, carrying out a consumption-absorption relationship analysis on the pre-built consumption-absorption matching groups through analysis values for the consumed electricity quantities and analysis values for the absorbed electricity quantities, and determining determined consumption-absorption matching groups; and an outputting module used for executing division work for the electricity generation clusters according to the determined consumption-absorption matching groups.

In a third aspect, the present invention provides an electronic device, and the electronic device includes:

Memory and processor;

the memory is used for storing computer-executable instructions, the processor is used for executing the computer-executable instructions, and when the computer-executable instructions are executed by the processor, the steps of the division method for the distributed renewable-energy electricity generation clusters are realized.

In a fourth aspect, the present invention provides a computer-readable storage medium storing computer-executable instructions, where when the computer-executable instructions are executed by a processor, the steps of the division method for the distributed renewable-energy electricity generation clusters are realized.

Compared with the prior art, the beneficial effects of the present invention are that: according to the present invention, through processing electric power consumption-absorption information and obtaining the analysis values for the consumed electricity quantities and the analysis values for the absorbed electricity quantities, the division effect for the electricity generation clusters may be effectively improved, so that the consumption-absorption relationships of the electricity generation clusters are more stable; through constructing the pre-built consumption-absorption matching groups, and carrying out the consumption-absorption relationship analysis by means of the analysis values for the consumed electricity quantities and the analysis values for the absorbed electricity quantities, the division for the electricity generation clusters is realized, so that generation of the case of energy waste caused by uneven division and distribution for the renewable energy generated by the electricity generation clusters is avoided, and then management efficiency for large-scale new energy sets is increased; and through sequentially marking the electricity generator sets and/or the energy consumption districts, a plurality of matching division manners are provided for the division for the electricity generation clusters, so that the division capability for the electricity generation clusters is further improved.

BRIEF DESCRIPTION OF DRAWINGS

In order to describe the technical solutions of the examples of the present invention more clearly, a brief introduction for the drawings needing to be used in the description for the examples will be provided below, apparently, the drawings in the description below show merely some examples of the present invention, and those of ordinary skill in the art may also derive other drawings from these drawings without making creative efforts. In the drawings:

FIG. 1 is a schematic diagram of an overall flow of a division method for distributed renewable-energy electricity generation clusters according to an example of the present invention.

DETAILED DESCRIPTION OF THE EMBODIMENTS

Figure 2:
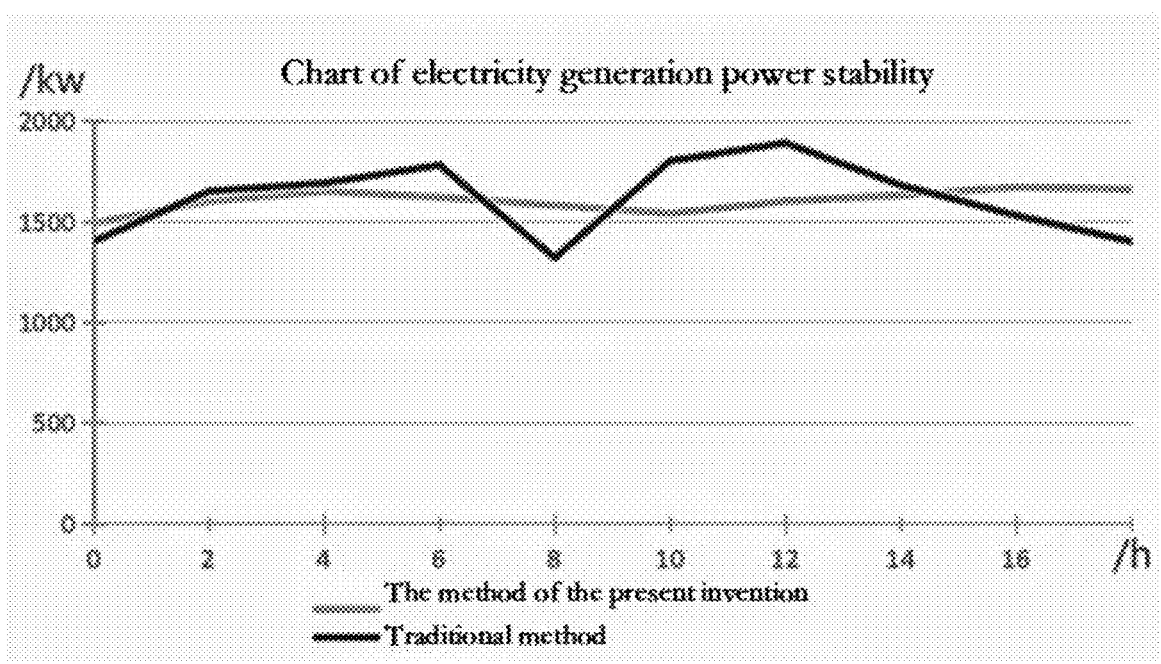
FIG. 2 is a comparison diagram of electricity generation power stability of the division method for the distributed renewable-energy electricity generation clusters according to the example of the present invention.

In order to make the above purposes, features, and advantages of the present invention more apparent and understandable, the specific implementation manners of the present invention are described below in detail in conjunction with the drawings of the present invention, and apparently, the examples described are merely a part rather than all of the examples of the present invention. On the basis of the examples of the present invention, all other examples obtained by those of ordinary skill in the art without creative efforts shall fall within the protection scope of the present invention.

A number of specific details are set forth in the description below to provide a thorough understanding for the present invention, however, the present invention may also be implemented in other manners different from those described herein, and those skilled in the art may make similar generalization without departing from the essence of the present invention, therefore, the present invention is not limited by the specific examples disclosed below.

Secondly, the term "one example" or "examples" referred to herein refers to a specific feature, structure, or characteristic that may be incorporated into at least one realization manner of the present invention. The term "in one example" appearing at different positions in the present specification does not necessarily refer to the same example, nor is it a separate or selective example that is mutually exclusive to other examples.

Example 1

Referring to FIG. 1, an example of the present invention is proposed, and provides a division method for distributed renewable-energy electricity generation clusters, and the division method for the distributed renewable-energy electricity generation clusters includes:

S1. obtaining electric power consumption-absorption data of the electricity generation clusters, where the electric power consumption-absorption data includes absorbed electricity quantities of all target single electricity generators, consumed electricity quantities of target energy consumption nodes, and distances from the target single electricity generators to the target energy consumption nodes.

Preferably, the target energy consumption nodes are represented as independent places that use renewable energy, such as factories, residential areas, and office buildings in a specified range; and the target single electricity generators are single wind electricity generators and/or single photovoltaic electricity generators.

S2. extracting the absorbed electricity quantities of the target single electricity generators or the consumed electricity quantities of the target energy consumption nodes in a specified period on the basis of the electric power consumption-absorption data, calculating deviation degrees of the absorbed electricity quantities of the target single electricity generators or the consumed electricity quantities of the target energy consumption nodes in the specified period, comparing the deviation degrees with a preset deviation threshold value interval, and combining a first set and a second set according to comparison results, so as to obtain analysis values for the absorbed electricity quantities of the corresponding target single electricity generators or analysis values for the consumed electricity quantities of the corresponding target energy consumption nodes.

Specifically, the extraction processing includes:

dividing a specified period into a plurality of standard time periods, and unifying durations of the standard time periods;

selecting one target single electricity generator or one target energy consumption node, and obtaining absorbed electricity quantities of the target single electricity generator in the standard time periods or consumed electricity quantities of the target energy consumption node in the standard time periods;

calculating deviation degrees of the absorbed electricity quantities and the consumed electricity quantities according to a variance formula;

comparing the deviation degrees with Xy1 and Xy2 in a preset deviation threshold value interval [Xy1, Xy2], where Xy1>Xy2; and counting intersections between the first set and the second set through a set operation, obtaining all the corresponding absorbed electricity quantities and consumed electricity quantities according to the intersections, and evaluating an average value of the absorbed electricity quantities or the consumed electricity quantities, so as to obtain analysis values for the absorbed electricity quantities of the corresponding target single electricity generators or analysis values for the consumed electricity quantities of the corresponding target energy consumption nodes.

Further, the comparing the deviation degrees with a preset deviation threshold value interval includes:

comparing the deviation degrees with Xy1 in a preset deviation threshold value interval;

if the deviation degrees are greater than Xy1, it indicates that the deviation degree values among the absorbed electricity quantities or the consumed electricity quantities in the standard time periods are large, sequentially deleting the values of the corresponding absorbed electricity quantities or the corresponding consumed electricity quantities according to an order of $|Xi-Xp|$ from large to small, and correspondingly calculating deviation degrees of remaining absorbed electricity quantities or remaining consumed electricity quantities until the deviation degrees are less than or equal to Xy1;

wherein Xp represents an average value of the corresponding absorbed electricity quantity or the corresponding consumed electricity quantity in the standard time periods used for calculating the corresponding deviation degrees;

obtaining all the deleted values of the absorbed electricity quantities or consumed electricity quantities, and combining the values into a first set;

comparing the deviation degrees with Xy2 in the preset deviation threshold value interval;

if the deviation degrees are greater than Xy2, it indicates that the deviation degree values among the absorbed electricity quantities or the consumed electricity quantities in the standard time periods are large, sequentially deleting the values of the corresponding absorbed electricity quantities or the corresponding consumed electricity quantities according to an order of $|Xi-Xp|$ from large to small, and correspondingly calculating deviation degrees of remaining absorbed electricity quantities or remaining consumed electricity quantities until the deviation degrees are less than or equal to Xy2;

obtaining all undeleted values of the absorbed electricity quantities or consumed electricity quantities, and combining the values into a second set.

Preferably, one target single electricity generator is taken as an example, the absorbed electricity quantities of the target single electricity generator in the standard time periods are obtained, and marked as Xi, where i=1, 2, . . . n, and n represents a number of all the standard time periods in a specified period; deviation degrees XL of Xi are calculated by means of a variance formula; the deviation degrees XL are compared with Xy1 and Xy2 in a preset deviation threshold value interval [Xy1, Xy2] respectively, if XL>Xy1, it indicates that the deviation degree values among the absorbed electricity quantities in the standard time periods are large, then the corresponding Xi values are sequentially deleted an order of $|Xi-Xp|$ from large to small, and the deviation degrees of the remaining Xi are correspondingly calculated until XL≤Xy1, and then all the deleted Xi values are obtained and combined into a first absorbed electricity quantity set; if XL>Xy2, it indicates that the deviation degree values among the absorbed electricity quantities in the standard time periods are large, then the corresponding Xi values are sequentially deleted an order of $|Xi-Xp|$ from large to small, and the deviation degrees of the remaining Xi are correspondingly calculated until XL≤Xy2, and then all undeleted Xi values are obtained and combined into a second absorbed electricity quantity set; and intersections between the second absorbed electricity quantity set and the first absorbed electricity quantity set are counted by means of a set operation, all the corresponding absorbed electricity quantities are obtained from the intersections, and then an average value is evaluated and recorded as an analysis value for the absorbed electricity quantities of the corresponding target single electricity generator.

Preferably, in the example, the extraction processing is also carried out on the consumed electricity quantities of the target energy consumption nodes in a specified period, the extraction processing manner is the same as that for the absorbed electricity quantities of the target single electricity generators in the specified period, a first consumed electricity quantity set and a second consumed electricity quantity set of the corresponding target energy consumption node are obtained according to an extraction processing result, intersections between the second consumed electricity quantity set and the first consumed electricity quantity set are counted by means of a set operation, all the corresponding consumed electricity quantities are obtained from the intersections, and then an average value of the consumed electricity quantities is evaluated and recorded as an analysis value for the consumed electricity quantities of the corresponding target energy consumption node.

It needs to be noted that, through extracting the absorbed electricity quantities of the target single electricity generators or the consumed electricity quantities of the target energy consumption nodes in the specified period, energy utilization efficiency can be increased, and through analyzing the absorbed electricity quantities of the single electricity generators, maximum utilization for the renewable energy may be realized, so that energy waste is reduced; and electric power distribution is further optimized, and electric power resources are reasonably distributed, so that energy demands of different areas are met.

S3. carrying out a division analysis on the electricity generation clusters on the basis of the analysis values for the consumed electricity quantities and the analysis values for the absorbed electricity quantities, constructing pre-built consumption-absorption matching groups for a plurality of electricity generator sets and energy consumption districts according to the distances from the target single electricity generators to the target energy consumption nodes, carrying out a consumption-absorption relationship analysis on the pre-built consumption-absorption matching groups through the analysis values for the consumed electricity quantities and the analysis values for the absorbed electricity quantities, redistributing the electricity generator sets and the energy consumption districts in the pre-built consumption-absorption matching groups according to an analysis result, and determining determined consumption-absorption matching groups.

Specifically, the division analysis includes:

grouping a plurality of adjacent target single electricity generators according to geographical positions of all the target single electricity generators, and forming a plurality of electricity generator sets;

grouping a plurality of adjacent target energy consumption nodes according to geographical positions of all the target energy consumption nodes, and forming a plurality of energy consumption districts;

In the example, the electricity generator sets and the energy consumption districts are divided by management personnel in a customized manner and according to geographical positions of the corresponding target single electricity generators and geographical positions of the target energy consumption nodes in a satellite map, a number of the electricity generator sets is the same as a number of the target energy consumption nodes, and preferably, the plurality of target energy consumption nodes in the energy consumption districts and the plurality of target single electricity generators in the electricity generator sets are contiguous.

Distance values from the electricity generator sets to the energy consumption districts are obtained according to the distances from the target single electricity generators to the target energy consumption nodes, and the energy consumption districts and the electricity generator sets which have the minimum distance value are enabled to form pre-built consumption-absorption matching groups; and preferably, the shortest distances from the electricity generator sets to the energy consumption districts are obtained, and represented as that: the shortest distance from one electricity generator set to one energy consumption district is taken as an example, the minimum distance value selected from the distances between the target single electricity generators in the electricity generator sets to the target energy consumption nodes in the energy consumption districts is the shortest distance from the electricity generator set to the energy consumption district, and in the shortest distances from one electricity generator set to the energy consumption districts, the energy consumption district and the electricity generator set which have the minimum shortest distance value are obtained and enabled to form a pre-built consumption-absorption matching group.

It needs to be noted that, the pre-built consumption-absorption matching groups and/or the determined consumption-absorption matching groups are represented as that: the electricity generator sets in the pre-built consumption-absorption matching groups and/or the determined consumption-absorption matching groups take charge of providing renewable electric power energy, and the energy consumption districts in the pre-built consumption-absorption matching groups and/or the determined consumption-absorption matching groups are used for using the corresponding electricity generator sets for providing renewable electric power energy; and meanwhile, the remaining electricity generator sets and the corresponding energy consumption districts form the pre-built consumption-absorption matching group.

Common energy consumption districts are obtained from the pre-built consumption-absorption matching groups, meanwhile, the energy consumption districts which do not exist in the pre-built consumption-absorption matching groups are obtained, the group of the energy consumption district and the electricity generator set which have the minimum shortest distance value is obtained to form a new pre-built consumption-absorption matching group, and meanwhile, the former pre-built consumption-absorption matching groups formed according to the common energy consumption districts are dissolved, and a plurality of unmatched electricity generator sets are formed; and the energy consumption districts which do not exist in the pre-built consumption-absorption matching groups and the unmatched electricity generator sets are enabled to form new pre-built consumption-absorption matching groups respectively, until there are no common energy consumption districts in the pre-built consumption-absorption matching groups.

Furthermore, the determining determined consumption-absorption matching groups includes:

calculating a total value of the consumed electricity quantities and a total value of the absorbed electricity quantities of the pre-built consumption-absorption matching groups on the basis of the analysis values for the consumed electricity quantities and the analysis values for the absorbed electricity quantities;

preferably, the calculating a total value of the consumed electricity quantities in the pre-built consumption-absorption matching groups is adding all the analysis values for the consumed electricity quantities in the pre-built consumption-absorption matching groups together; and the calculating a total value of the absorbed electricity quantities in the pre-built consumption-absorption matching groups is adding all the analysis values for the absorbed electricity quantities in the pre-built consumption-absorption matching groups together.

comparing the total value of the consumed electricity quantities and the total value of the absorbed electricity quantities in the pre-built consumption-absorption matching groups with a preset floating threshold value, if either $NZ<HZ-FY$ or $NZ>HZ+FY$ is met, it indicates that matching for the pre-built consumption-absorption matching groups is failed, and consumption-absorption relationships between all the target single electricity generators and all the corresponding target energy consumption nodes in the pre-built consumption-absorption matching groups do not meet division standards, and then carrying out matching analysis and division;

wherein FY represents the floating threshold value, HZ represents the total value of the consumed electricity quantities in one pre-built consumption-absorption matching group, NZ represents the total value of the absorbed electricity quantities in one pre-built consumption-absorption matching group, and the division standards are determined according to the preset floating threshold value;

furthermore, the energy consumption districts are sequentially marked according to distances among the center points of corresponding geographical positions of the energy consumption districts composed of the target energy consumption nodes in a contiguous manner, where the center points of the corresponding geographical positions of the energy consumption districts are selected according to geographical positions of the plurality of target energy consumption nodes in the energy consumption districts;

sequentially marking the electricity generator sets according to distances among the center points of corresponding geographical positions of the electricity generator sets composed of the target single electricity generators in a contiguous manner, wherein the center points of the corresponding geographical positions of the electricity generator sets are selected according to geographical positions of the plurality of target single electricity generators in the electricity generator sets;

carrying out a matching analysis on the first corresponding pre-built consumption-absorption matching group in the sequential marking through the energy consumption districts with sequential marks or the electricity generator sets with sequential marks;

obtaining the corresponding pre-built consumption-absorption matching groups of the remaining energy consumption districts through the sequential marking, and carrying out matching success confirmation and division for the pre-built consumption-absorption matching groups in a manner of carrying out the matching analysis on the first corresponding pre-built consumption-absorption matching group in the sequential marking; and recording the pre-built consumption-absorption matching groups with successful matching as determined consumption-absorption matching groups on the basis of results obtained through the matching.

Preferably, if that HZ−FY is less than or equal to NZ and NZ is less than or equal to HZ+FY is met, it indicates that the matching for the pre-built consumption-absorption matching groups is successful, that is, the consumption-absorption relationships between all the target single electricity generators and all the corresponding target energy consumption nodes in the pre-built consumption-absorption matching groups meet division standards.

Furthermore, the matching analysis for the energy consumption districts includes:

obtaining the corresponding pre-built consumption-absorption matching group of the first energy consumption district through sequential marking;

when the matching for the pre-built consumption-absorption matching group is failed, and NZ<HZ−FY is met, it indicates that there are too many corresponding target energy consumption nodes of the energy consumption district in the pre-built consumption-absorption matching group, and when NZ>HZ+FY is met, it indicates that there are too few corresponding target energy consumption nodes of the energy consumption district in the pre-built consumption-absorption matching group;

according to the corresponding sequential mark of the energy consumption district, obtaining a sequential mark adjacent to the sequential mark and the corresponding adjacent energy consumption district, extracting the target energy consumption node with the minimum shortest distance value from the target energy consumption node in the adjacent energy consumption district from the energy consumption district, and guiding the target energy consumption node into the adjacent energy consumption district; and comparing the total value of the consumed electricity quantities and the total value of the absorbed electricity quantities in the pre-built consumption-absorption matching groups with a preset floating threshold value, until that HZ−FY is less than or equal to NZ and NZ is less than or equal to HZ+FY is met.

Furthermore, the matching analysis for the electricity generator sets includes:

obtaining the corresponding pre-built consumption-absorption matching group of the first electricity generator set through sequential marking;

when the matching for the pre-built consumption-absorption matching group is failed, and NZ>HZ+FY is met, it indicates that there are too many corresponding target single electricity generators of the electricity generator set in the pre-built consumption-absorption matching group, and when NZ<HZ−FY is met, it indicates that there are too few corresponding target single electricity generators of the electricity generator set in the pre-built consumption-absorption matching group;

according to the corresponding sequential mark of the electricity generator set, obtaining the sequential mark adjacent to the sequential mark and the corresponding adjacent electricity generator set, extracting the target single electricity generator with the minimum distance value from the target single electricity generator in the adjacent electricity generator set from the electricity generator set, and guiding the target single electricity generator into the adjacent electricity generator set; and comparing the total value of the consumed electricity quantities and the total value of the absorbed electricity quantities in the pre-built consumption-absorption matching groups with a preset floating threshold value, until that HZ−FY is less than or equal to NZ and NZ is less than or equal to HZ+FY is met.

It needs to be noted that, the analysis values for the consumed electricity quantities aim at an electric power demand analysis for a specific area or node, and are used for knowing a mode and a trend of electric power consumption, while the analysis values for the absorbed electricity quantities aim at electric power provided by the renewable-energy electricity generation clusters, and are used for measuring output of renewable energy. According to the division and analysis for the electricity generation clusters, the electricity generation clusters are divided and analyzed through comparing the data of the consumed electricity quantities and the absorbable electricity quantities, the electricity generator sets and the energy consumption districts are combined or matched to meet an electric power demand to the greatest extent, a layout of the electricity generation clusters may be optimized to maximize utilization for the renewable energy, and meanwhile, an energy demand is met, and energy waste is reduced. Efficiency and loss of electric power transmission are considered for the distances from the target single electricity generators to the target energy consumption nodes, so that the distances between the electricity generator sets and the energy consumption nodes are determined. Short distances bring lower electricity transmission loss and higher transmission efficiency.

According to the construction and analysis for the pre-built consumption-absorption matching groups, the plurality of electricity generator sets and energy consumption districts are matched and combined in advance on the basis of matching between the distances and electric power, so that electricity generation and consumption are better matched, and loss in electric power transmission is reduced.

According to the analysis for the consumption-absorption relationships, and redistribution, a detailed analysis for the consumption-absorption relationships is carried out on the electricity generator sets and the energy consumption districts in the matched groups to establish more effective consumption-absorption relationships, so that stable and high-efficiency electric power supply is guaranteed, and combinations of the electricity generator sets and the energy consumption districts which are optimally matched are finally determined.

In summary, the purpose is to optimize the matching between renewable-energy electricity generation and electric power consumption, reduce energy loss, and increase energy utilization efficiency; and through analyzing consumption and output data, and considering efficiency and stability of electric power transmission, establishment for more intelligent and more efficient renewable-energy electricity generation clusters may be promoted, so that a contribution is made to sustainability and stability of an energy system.

S4. executing division for the electricity generation clusters according to the determined consumption-absorption matching groups.

Finally, the determined consumption-absorption matching groups are provided to the management personnel, and division execution for the electricity generation clusters is carried out, so that utilization efficiency for distributed electricity generation resources is increased.

It needs to be noted that, through processing electric power consumption-absorption information and obtaining the analysis values for the consumed electricity quantities and the analysis values for the absorbed electricity quantities, and meanwhile, through constructing the pre-built consumption-absorption matching groups, and then carrying out the consumption-absorption relationship analysis by means of the analysis values for the consumed electricity quantities and the analysis values for the absorbed electricity quantities, the division for the electricity generation clusters is realized, so that the division effect for the electricity generation clusters may be effectively improved, the consumption-absorption relationships of the electricity generation clusters are more stable, generation of the case of energy waste caused by uneven division and distribution for the renewable energy generated by the electricity generation clusters is avoided, and then management efficiency for large-scale new energy sets is increased; and meanwhile, a plurality of matching division manners are provided for the division for the electricity generation clusters, and through sequentially marking the electricity generator sets, the division capability for the electricity generation clusters is further improved, and consumption-absorption capability for distributed energy can be effectively improved.

The above is a schematic solution of a division method for distributed renewable-energy electricity generation clusters of the example. It needs to be noted that, the technical solution of the division system for the distributed renewable-energy electricity generation clusters and the technical solution of the above division method for the distributed renewable-energy electricity generation clusters belong to the same concept, and the description for the technical solution of the above division method for the distributed renewable-energy electricity generation clusters may be referred to for details that are not described in detail in the technical solution of the division system for the distributed renewable-energy electricity generation clusters in the example.

Figure 3:
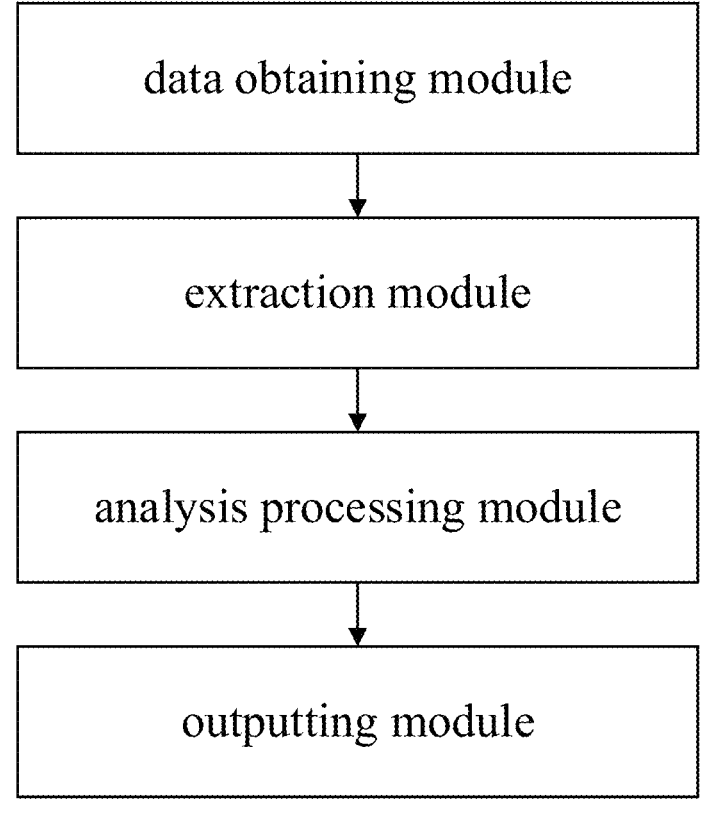
FIG. 3 is a schematic diagram of a division system for distributed renewable-energy electricity generation clusters according to the example of the present invention.

As shown in FIG. 3, the division system for the distributed renewable-energy electricity generation clusters in the example includes:

a data obtaining module used for obtaining electric power consumption-absorption data of the electricity generation clusters, wherein the electric power consumption-absorption data comprises absorbed electricity quantities of target single electricity generators, consumed electricity quantities of target energy consumption nodes, and distances from the target single electricity generators to the target energy consumption nodes;

an extraction module used for carrying out extraction processing on the absorbed electricity quantities of the target single electricity generators or the consumed electricity quantities of the target energy consumption nodes in a specified period;

an analysis processing module used for carrying out a division analysis on the electricity generation clusters, constructing pre-built consumption-absorption matching groups, carrying out a consumption-absorption relationship analysis on the pre-built consumption-absorption matching groups through analysis values for the consumed electricity quantities and analysis values for the absorbed electricity quantities, and determining determined consumption-absorption matching groups; and an outputting module used for executing division work for the electricity generation clusters according to the determined consumption-absorption matching groups.

The example further provides an electronic device which is applicable for the case of division for distributed renewable-energy electricity generation clusters, and includes:

a memory and a processor, where the memory is used for storing computer-executable instructions, and the processor is used for executing the computer-executable instructions to realize the division method for the distributed renewable-energy electricity generation clusters, which is disclosed by the above example.

The example further provides a storage medium in which a computer program is stored, where when the program is executed by a processor, the division method for the distributed renewable-energy electricity generation clusters, which is disclosed by the above example is realized.

The storage medium disclosed by the example and the division method for the distributed renewable-energy electricity generation clusters, which is disclosed by the above example belong to the same invention concept, the above example may be referred to for technical details that are not described in detail in the example, and moreover, the example and the above example have the same beneficial effects.

Through the above description for the implementation manner, those skilled in the art may clearly understand that, the present invention may be realized by virtue of software and necessary general hardware, and certainly, the present invention may also be realized through hardware, however, in many cases, the former is a better implementation manner. On the basis of this understanding, the technical solution of the present invention essentially or a part that contributes to the prior art may be embodied in the form of a software product, and the computer software product may be stored in a computer-readable storage medium, such as a floppy disk, a read-only memory (ROM), a random access memory (RAM), a flash memory (FLASH), a hard disk, or an optical disk of a computer, and includes a plurality of instructions used for enabling a computer device (which may be a personal computer, a server, or a network device, etc.) to execute the methods of the various examples of the present invention.

Embodiment 2

Referring to Table 1 and FIG. 2, an example of the present invention is proposed, and provides a division method for distributed renewable-energy electricity generation clusters, and in order to verify the beneficial effects, a comparison result of two solutions is provided.

In the example, according to a use scene of the electricity generation clusters, the division method for the distributed renewable-energy electricity generation clusters of the present invention is used for carrying out a simulation experiment, and compared with a traditional division method, comparison verification is carried out from the aspects of increase for electricity generation efficiency, stability of the consumption-absorption relationships, reduction for energy waste, increase for management efficiency for new energy sets, environment influence, etc.

The increase for the electricity generation efficiency is realized through comparing an energy utilization rate and electricity generation power stability of the clusters before and after the division, where through comparing an actual output of electricity generation devices with a theoretical maximum output, whether effective utilization for the energy is improved or not through the division is evaluated; and a fluctuation condition of electricity generation powers of the clusters after the division is analyzed, and influence of the division on the stability of the electricity generation powers is evaluated.

Flexibility of power grid scheduling is verified through evaluating a response speed of the clusters after the division to the power grid scheduling, energy use is inspected from the perspective of a supply-demand matching degree and an energy storage utilization rate, the supply-demand matching degree of the clusters before and after the division is analyzed, and influence of the division on the energy storage utilization rate is evaluated. Therefore, it is guaranteed that energy supply and demand can be better matched after the division, so that unnecessary energy waste is reduced. Therefore, it is guaranteed that the energy storage system can store and release the energy more effectively.

TABLE 1

| Verification comparison data between the method of the present invention and a traditional method | | |
| --- | --- | --- |
| | Traditional method | The method of the present invention |
| Energy utilization rate | 76.8% | 98.5% |
| Response speed to power grid scheduling | 5.14 s | 1.72 s |
| Supply-demand matching degree | 86.1% | 98.3% |
| Energy storage utilization rate | 80.3% | 97.4% |
| Running cost reduction ratio | 12% | 36% |
| Maintenance period | 3 days | 7 days |
| Carbon emission reduction rate | 15% | 29% |

It may be known from Table 1 that, through the division of the method of the present invention, the effective utilization for the energy is significantly improved, and the response speed of the clusters after the division to the power grid scheduling is evaluated to be significantly increased, so that the flexibility of the power grid scheduling is improved, and it is guaranteed that the power grid can be flexibly adjusted to adapt to the fluctuations of the renewable energy; and the supply-demand matching degree of the clusters after the division is increased by 12% compared to the traditional method, so that it is guaranteed that energy supply and demand can be better matched after the division, and unnecessary energy waste is reduced; and moreover, due to the increase for the energy storage utilization rate, the energy storage system can store and release the energy more effectively.

Meanwhile, it may be seen that, due to reduction for a running cost, management efficiency for the sets is significantly increased, and due to extension of a maintenance period, reliability and stability of the sets are guaranteed; and due to the beneficial effect of carbon emission reduction on an environment, more environmentally-friendly energy electricity generation is promoted.

It may be known from FIG. 2 that, through a comparison for the fluctuation condition of the electricity generation powers of the clusters after the division, the stability of the electricity generation powers is significantly improved, and according to the present invention, the division effect for the electricity generation clusters may be effectively improved, so that the consumption-absorption relationships of the electricity generation clusters are more stable; and generation of the case of energy waste caused by uneven division and distribution for the renewable energy generated by the electricity generation clusters can be avoided, and then management efficiency for large-scale new energy sets is increased.

It should be noted that, the above examples are merely used for illustrating the technical solution of the present invention and are not for limitation, although the present invention is described in detail with reference to the preferred examples, those of ordinary skill in the art should understand that, the technical solutions of the present invention may be modified or equivalently substituted without departing from the spirit and scope of the technical solution of the present invention, and all those modifications or equivalent substitutions should be included in the scope of the claims of the present invention.

What is claimed is:

1. A division method for distributed renewable-energy electricity generation clusters, comprising:

obtaining electric power consumption-absorption data of electricity generation clusters, wherein the electric power consumption-absorption data comprises absorbed electricity quantities of target single electricity generators, consumed electricity quantities of target energy consumption nodes, and distances from the target single electricity generators to the target energy consumption nodes;

extracting the absorbed electricity quantities of the target single electricity generators or the consumed electricity quantities of the target energy consumption nodes in a specified period on the basis of the electric power consumption-absorption data, calculating deviation degrees of the absorbed electricity quantities of the target single electricity generators or the consumed electricity quantities of the target energy consumption nodes in the specified period, comparing the deviation degrees with a preset deviation threshold value interval, and combining a first set and a second set according to comparison results, so as to obtain analysis values for the absorbed electricity quantities of the corresponding target single electricity generators or analysis values for the consumed electricity quantities of the corresponding target energy consumption nodes;

carrying out a division analysis on the electricity generation clusters on the basis of the analysis values for the consumed electricity quantities and the analysis values for the absorbed electricity quantities, constructing pre-built consumption-absorption matching groups for a plurality of electricity generator sets and energy consumption districts according to the distances from the target single electricity generators to the target energy consumption nodes, carrying out a consumption-absorption relationship analysis on the pre-built consumption-absorption matching groups through the analysis values for the consumed electricity quantities and the analysis values for the absorbed electricity quantities, redistributing the electricity generator sets and the energy consumption districts in the pre-built consumption-absorption matching groups according to an analysis result, and determining determined consumption-absorption matching groups; and executing division for the electricity generation clusters according to the determined consumption-absorption matching groups.

2. The division method for the distributed renewable-energy electricity generation clusters according to claim 1, wherein the extracting processing comprises:

dividing a specified period into a plurality of standard time periods, and unifying durations of the standard time periods;

selecting one target single electricity generator or one target energy consumption node, and obtaining absorbed electricity quantities of the target single electricity generator in the standard time periods or consumed electricity quantities of the target energy consumption node in the standard time periods;

calculating deviation degrees of the absorbed electricity quantities and the consumed electricity quantities according to a variance formula;

comparing the deviation degrees with Xy1 and Xy2 in a preset deviation threshold value interval [Xy1, Xy2], where Xy1>Xy2; and counting intersections between the first set and the second set through a set operation, obtaining all the corresponding absorbed electricity quantities and consumed electricity quantities according to the intersections, and evaluating an average value of the absorbed electricity quantities or the consumed electricity quantities, so as to obtain analysis values for the absorbed electricity quantities of the corresponding target single electricity generators or analysis values for the consumed electricity quantities of the corresponding target energy consumption nodes.

3. The division method for the distributed renewable-energy electricity generation clusters according to claim 2, wherein the comparing the deviation degrees with a preset deviation threshold value interval comprises:

comparing the deviation degrees with Xy1 in a preset deviation threshold value interval;

if the deviation degrees are greater than Xy1, it indicates that the deviation degree values among the absorbed electricity quantities or the consumed electricity quantities in the standard time periods are large, sequentially deleting the values of the corresponding absorbed electricity quantities or the corresponding consumed electricity quantities according to an order of $|Xi{-}Xp|$ from large to small, and correspondingly calculating deviation degrees of remaining absorbed electricity quantities or remaining consumed electricity quantities until the deviation degrees are less than or equal to Xy1;

wherein Xp represents an average value of the corresponding absorbed electricity quantity or the corresponding consumed electricity quantity in the standard time periods used for calculating the corresponding deviation degrees;

obtaining all the deleted values of the absorbed electricity quantities or consumed electricity quantities, and combining the values into a first set;

comparing the deviation degrees with Xy2 in the preset deviation threshold value interval;

if the deviation degrees are greater than Xy2, it indicates that the deviation degree values among the absorbed electricity quantities or the consumed electricity quantities in the standard time periods are large, sequentially deleting the values of the corresponding absorbed electricity quantities or the corresponding consumed electricity quantities according to an order of $|Xi{-}Xp|$ from large to small, and correspondingly calculating deviation degrees of remaining absorbed electricity quantities or remaining consumed electricity quantities until the deviation degrees are less than or equal to Xy2;

obtaining all undeleted values of the absorbed electricity quantities or consumed electricity quantities, and combining the values into a second set.

4. The division method for the distributed renewable-energy electricity generation clusters according to claim 3, wherein the division analysis comprises:

grouping a plurality of adjacent target single electricity generators according to geographical positions of all the target single electricity generators, and forming a plurality of electricity generator sets;

grouping a plurality of adjacent target energy consumption nodes according to geographical positions of all the target energy consumption nodes, and forming a plurality of energy consumption districts;

obtaining distance values from the electricity generator sets to the energy consumption districts according to the distances from the target single electricity generators to the target energy consumption nodes, and enabling the energy consumption districts and the electricity generator sets which have the minimum distance value to form pre-built consumption-absorption matching groups;

obtaining common energy consumption districts from the pre-built consumption-absorption matching groups, meanwhile, obtaining the energy consumption districts which do not exist in the pre-built consumption-absorption matching groups, obtaining the group of the energy consumption district and the electricity generator set which have the minimum distance value from the electricity generator sets corresponding to the common energy consumption districts to form new pre-built consumption-absorption matching groups, and meanwhile, dissolving the former pre-built consumption-absorption matching groups formed according to the common energy consumption districts, and forming a plurality of unmatched electricity generator sets; and enabling the energy consumption districts which do not exist in the pre-built consumption-absorption matching groups and the unmatched electricity generator sets to form new pre-built consumption-absorption matching groups respectively, until there are no common energy consumption districts in the pre-built consumption-absorption matching groups.

5. The division method for the distributed renewable-energy electricity generation clusters according to claim 4, wherein the determining determined consumption-absorption matching groups comprises:

calculating a total value of the consumed electricity quantities and a total value of the absorbed electricity quantities of the pre-built consumption-absorption matching groups on the basis of the analysis values for the consumed electricity quantities and the analysis values for the absorbed electricity quantities;

comparing the total value of the consumed electricity quantities and the total value of the absorbed electricity quantities in the pre-built consumption-absorption matching groups with a preset floating threshold value, if either NZ<HZ−FY or NZ>HZ+FY is met, it indicates that matching for the pre-built consumption-absorption matching groups is failed, and consumption-absorption relationships between all the target single electricity generators and all the corresponding target energy consumption nodes in the pre-built consumption-ab-sorption matching groups do not meet division stan-dards, and then carrying out matching analysis and division;

wherein FY represents the floating threshold value, HZ represents the total value of the consumed electricity quantities in one pre-built consumption-absorption matching group, NZ represents the total value of the absorbed electricity quantities in one pre-built con-sumption-absorption matching group, and the division standards are determined according to the preset float-ing threshold value;

sequentially marking the energy consumption districts according to distances among the center points of corresponding geographical positions of the energy consumption districts composed of the target energy consumption nodes in a contiguous manner, wherein the center points of the corresponding geographical positions of the energy consumption districts are selected according to geographical positions of the plurality of target energy consumption nodes in the energy consumption districts;

sequentially marking the electricity generator sets accord-ing to distances among the center points of correspond-ing geographical positions of the electricity generator sets composed of the target single electricity generators in a contiguous manner, wherein the center points of the corresponding geographical positions of the electricity generator sets are selected according to geographical positions of the plurality of target single electricity generators in the electricity generator sets;

carrying out a matching analysis on the first correspond-ing pre-built consumption-absorption matching group in the sequential marking through the energy consump-tion districts with sequential marks or the electricity generator sets with sequential marks;

obtaining the corresponding pre-built consumption-ab-sorption matching groups of the remaining energy consumption districts through the sequential marking, and carrying out matching success confirmation and division for the pre-built consumption-absorption matching groups in a manner of carrying out the matching analysis on the first corresponding pre-built consumption-absorption matching group in the sequen-tial marking; and recording the pre-built consumption-absorption matching groups with successful matching as determined con-sumption-absorption matching groups on the basis of results obtained through the matching.

6. The division method for the distributed renewable-energy electricity generation clusters according to claim 5, wherein the matching analysis for the energy consumption districts comprises:

obtaining the corresponding pre-built consumption-ab-sorption matching group of the first energy consump-tion district through sequential marking;

when the matching for the pre-built consumption-absorp-tion matching group is failed, and NZ<HZ−FY is met, it indicates that there are too many corresponding target energy consumption nodes of the energy consumption district in the pre-built consumption-absorption match-ing group, and when NZ>HZ+FY is met, it indicates that there are too few corresponding target energy consumption nodes of the energy consumption district in the pre-built consumption-absorption matching group;

according to the corresponding sequential mark of the energy consumption district, obtaining the sequential mark adjacent to the sequential mark and the corre-sponding adjacent energy consumption district, extract-ing the target energy consumption node with the mini-mum distance value from the target energy consumption node in the adjacent energy consumption district from the energy consumption district, and guid-ing the target energy consumption node into the adja-cent energy consumption district; and comparing the total value of the consumed electricity quantities and the total value of the absorbed electricity quantities in the pre-built consumption-absorption matching groups with a preset floating threshold value, until that HZ−FY is less than or equal to NZ and NZ is less than or equal to HZ+FY is met.

7. The division method for the distributed renewable-energy electricity generation clusters according to claim 5, wherein the matching analysis for the electricity generator sets comprises:

obtaining the corresponding pre-built consumption-ab-sorption matching group of the first electricity genera-tor set through sequential marking;

when the matching for the pre-built consumption-absorp-tion matching group is failed, and NZ>HZ+FY is met, it indicates that there are too many corresponding target single electricity generators of the electricity generator set in the pre-built consumption-absorption matching group, and when NZ<HZ−FY is met, it indicates that there are too few corresponding target single electricity generators of the electricity generator set in the pre-built consumption-absorption matching group;

according to the corresponding sequential mark of the electricity generator set, obtaining the sequential mark adjacent to the sequential mark and the corresponding adjacent electricity generator set, extracting the target single electricity generator with the minimum distance value from the target single electricity generator in the adjacent electricity generator set from the electricity generator set, and guiding the target single electricity generator into the adjacent electricity generator set; and comparing the total value of the consumed electricity quantities and the total value of the absorbed electricity quantities in the pre-built consumption-absorption matching groups with a preset floating threshold value, until that HZ−FY is less than or equal to NZ and NZ is less than or equal to HZ+FY is met.

8. A division system for distributed renewable-energy electricity generation clusters, comprising:

a data obtaining module used for obtaining electric power consumption-absorption data of electricity generation clusters, wherein the electric power consumption-ab-sorption data comprises absorbed electricity quantities of target single electricity generators, consumed elec-tricity quantities of target energy consumption nodes, and distances from the target single electricity genera-tors to the target energy consumption nodes;

an extraction module used for carrying out extraction processing on the absorbed electricity quantities of the target single electricity generators or the consumed electricity quantities of the target energy consumption nodes in a specified period;

an analysis processing module used for carrying out a division analysis on the electricity generation clusters, constructing pre-built consumption-absorption matching groups, carrying out a consumption-absorption relationship analysis on the pre-built consumption-absorption matching groups through analysis values for the consumed electricity quantities and analysis values for the absorbed electricity quantities, and determining determined consumption-absorption matching groups; and an outputting module used for executing division work for the electricity generation clusters according to the determined consumption-absorption matching groups.

9. A computer-readable storage medium storing computer-executable instructions, wherein when the computer-executable instructions are executed by a processor, the steps of the division method for the distributed renewable-energy electricity generation clusters according to claim 1 are realized.

* * * * *